March 6, 1956  M. G. BROWN ET AL  2,737,079
MICROSCOPE AND CAMERA COMBINATION
Filed March 27, 1952  2 Sheets-Sheet 1
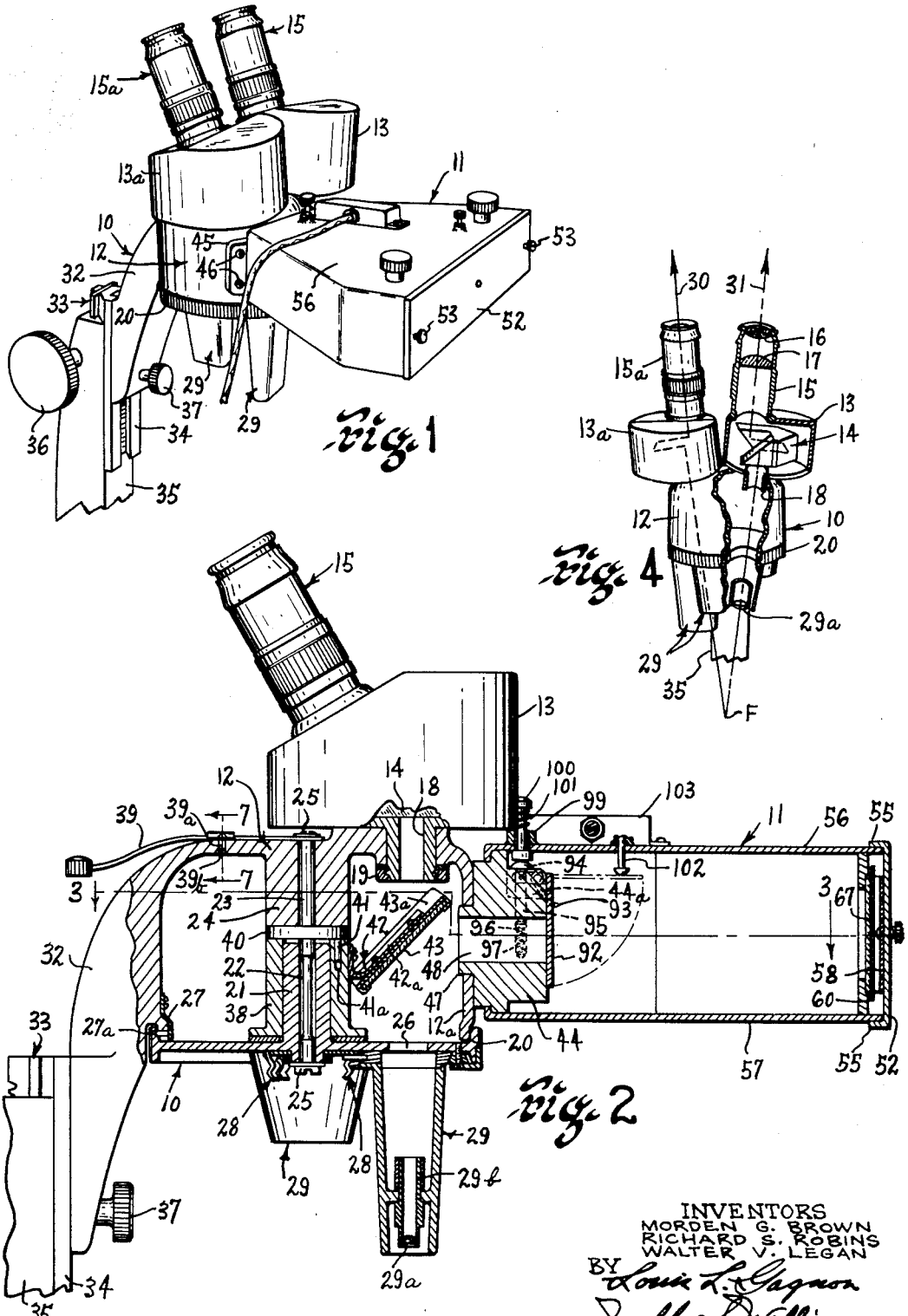
INVENTORS
MORDEN G. BROWN
RICHARD S. ROBINS
WALTER V. LEGAN
BY Louis L. Gagnon
Noble S. Williams
ATTORNEYS

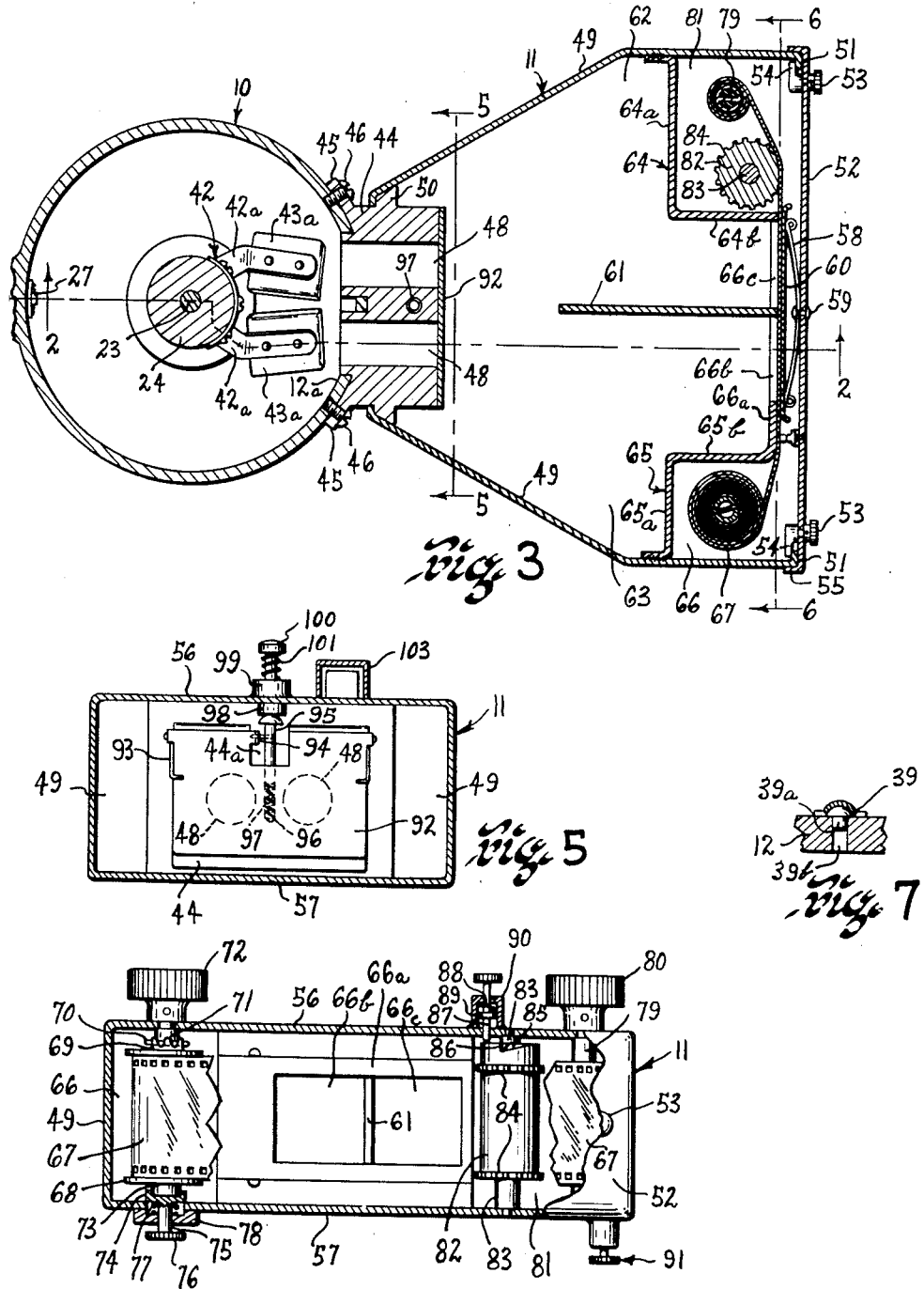

United States Patent Office 2,737,079
Patented Mar. 6, 1956

2,737,079
MICROSCOPE AND CAMERA COMBINATION

Morden G. Brown and Richard S. Robins, Darien, and Walter V. Legan, Glenbrook, Conn., assignors to American Optical Company, Southbridge, Mass., a voluntary association of Massachusetts Application March 27, 1952, Serial No. 278,896

5 Claims. (Cl. 88—24)

This invention relates to improvements in photomicroscopic apparatus and has particular reference to combined microscopic apparatus and photographic apparatus arranged to produce three dimensional pictures of microscopic specimens.

One of the principal objects of this invention is to provide a stereophotomicrographic device wherein specimens can be viewed through conventional stereoscopic microscope optical systems and subsequently, or substantially immediately when desired, photographed through the objectives of the said optical systems for the purpose of producing three dimensional pictures of said specimens substantially as observed through the eye pieces of said optical systems.

Another object is to provide a stereophotomicrographic device embodying a camera so constructed and arranged as to function cooperatively with the dual objectives of a stereoscopic microscope whereby the two images of three dimensional pictures of the specimen to be photographed can be made simultaneously.

Another object is to provide a device of the above character embodying improved means for readily shunting the optical paths from the stereoscopic microscope to the camera operatively associated therewith, whereby said three dimensional pictures can be made.

Another object is to provide an improved stereophotographic camera for attachment to a stereoscopic microscope, said camera being so constructed and arranged that the plane of the film carried thereby will be consistently retained at a predetermined spacial relation with respect to the specimen being viewed and photographed, said spacial relation being substantially equal to the object-to-image distance of the microscope.

When a stereoscopic microscope having pairs of parfocalized objectives is to be used, the object-to-image distance will remain substantially unchanged when different pairs of these objectives are used, and accordingly a photographic device for use therewith in order to be of real value should be of such construction that the film in the camera will remain in focus at all times even though one pair of objectives is interchanged for another of different magnification. It is, accordingly, an additional object of the invention to provide, in conjunction with a stereoscopic microscope having a plurality of pairs of parfocalized objectives, means including a camera of special construction whereby a pair of stereoscopic photomicrographic pictures may be made at selected magnifications by use of different pairs of objectives and without requiring readjustment of the microscopic or the camera attached thereto.

Other objects and advantages of the invention will become apparent from the following description taken in connection with the accompanying drawings, in which:

Fig. 1 is a perspective view of a preferred embodiment of the invention;

Fig. 2 is an enlarged fragmentary vertical sectional view taken substantially on line 2—2 of Fig. 3;

Fig. 3 is a fragmentary horizontal sectional view taken substantially on line 3—3 of Fig. 2;

Fig. 4 is a fragmentary front elevational and partial sectional view of the microscope portion of the device;

Fig. 5 is a vertical sectional view taken substantially on line 5—5 of Fig. 3;

Fig. 6 is a vertical sectional view taken substantially on line 6—6 of Fig. 3; and Fig. 7 is a vertical sectional view taken substantially on line 7—7 of Fig. 2.

The prior art teaches the combined use of cameras and microscopes for producing enlarged pictures of microscopic specimens. However, no efficient means has been provided for producing three dimensional pictures of microscopic specimens. The present invention accomplishes this objective by combining a stereoscopic microscope with a camera, wherein said camera is so constructed and arranged as to receive the dual stereoscopic images produced by the objectives of the microscope, the images being reproduced photographically in spaced relation on a film carried by the camera. The present invention further provides efficient means and method of simultaneously recording the dual images on film whereby stereoscopic pictures can be made of living and moving microscopic matter.

This latter feature is believed especially advantageous since it is often desirable to make three dimensional pictures of living and moving microscopic subjects such as small insects, living bacteria, or similar micro-organisms, in which case separate right and left eye images mades at different time intervals may not be satisfactory due to the fact that the specimen may have moved between the formation of the two images.

Referring more particularly to the drawings, wherein like characters of reference designate like parts throughout the several views, there is disclosed in Fig. 1 a preferred embodiment of the invention which comprises a stereoscopic microscope 10 having a stereoscopic camera 11 attached thereto. The microscope 10 comprises the usual main housing 12 on the upper side of which are located a pair of spaced prism housings 13 and 13a in which are disposed the conventional image erecting prism systems 14 (Fig. 4), with eyepieces 15 and 15a respectively being disposed on the upper sides of the housings 13 and 13a. The eyepieces 15 and 15a, as shown in Fig. 4, are provided with the usual eye lenses 16 and field lenses 17, the interior of each eyepiece 15 and 15a communicating with the interior of the respective housings 13 and 13a.

The lower side of each housing 13 and 13a is provided with a downwardly extending tubular projecting portion 18 which is adapted to extend through an opening formed in the upper side of the main housing 12. The lower end of the projection 18, as shown in Fig. 2, is threaded to receive a nut 19 whereby the housings 13 and 13a are secured in positions on the main housing 12. The lower side of the main housing 12 is enclosed by a rotatable nosepiece 20 which is provided with a centrally located upwardly extending hub 21 having a longitudinal bore 22 therein in which is located the lower portion of an elongated pivot 23 about the axis of which the nosepiece 20 is adapted to rotate. The upper end of the pivot member 23 is rotatably disposed within a longitudinal bore provided in a downwardly extending boss 24 formed on the upper portion of the main housing 12. The pivot member 23 is restrained from undesired longitudinal movement by means such as screw and washer arrangements 25 located at each end thereof.

The rotatable nosepiece 20 is provided with a plurality of openings 26 therethrough, which openings 26 can be accurately concentrically aligned with the central openings in the extensions 18 of the prism housings 13 and 13a by means of a spring detent 27 which is adapted, when one or another of the plurality of openings 26 is aligned with the openings in the tubular extensions 18, to engage one or another of a plurality of depressions 27a formed in the adjacent rim portion of the nosepiece 20.

Mounted externally beneath each of the openings 26 and removably connected to the nosepiece 20 by suitable spring clips 28 is a paired objective 29. Each objective 29 consists of two achromatically corrected lens systems 29a which are centered and securely mounted in the holding portion 29b and are adapted to project the respective right and left eye images through the main housing 12 and prism systems 14 to the respective right and left eyepieces 15a and 15. Thus, a specimen (not shown) to be viewed through the microscope 10 can be seen by an observer viewing through the eyepieces 15 and 15a. It is to be understood that the microscope is preferably designed so that the axes of the eyepieces converge at a predetermined angle, which is preferably the normal angle of convergence of the eyes for reading and other close work.

The optical paths for the respective left and right eyes are indicated in Fig. 4 by lines 30 and 31 respectively. Thus, it will be seen that a specimen located at the focal point F will be viewed stereoscopically by an observer in the eyepieces 15 and 15a.

Each of the plurality of pairs of objectives 29 is designed so as to provide at an actual image plane adjacent said eye lenses a different controlled magnification and thus the different pairs of objectives can be readily interchanged when a change of magnification is desired by selective alignment of the proper pair with the tubular projections 18 by merely rotating the nosepiece 20. While reference has already been made to the object-to-image distance, it will be readily appreciated that this distance will be affected by any other optical elements in the system and located between the objective and its predetermined image plane. In other words, when an objective of any one pair of parfocalized objectives is focused upon the specimen, the effective back focal length thereof will be such as to tend to form an actual image of the specimen at an image plane which is common to the objectives of the other pairs as well. Of course if any refracting optical element intercepts the image forming rays coming from the objective, such as the field lens 17, it may in effect axially displace this common image plane and change the image distance. Thus, the location of the actual image plane in the system shown in Fig. 4 is somewhat closer to the objective 29 than the predetermined image plane of the objective, due to the presence of the field lens 17.

The main housing 12 is provided with a downwardly and rearwardly extending arm 32 which has a portion 33 thereof adapted to slidably interfit with a grooved portion 34 of an upright 35 carried by a conventional microscope base or stage (not shown). A knob 36 is connected by any suitable operating means so as to function, when manually rotated, to move the arm 32 and consequently all the parts supported thereby in a direction toward and away from a specimen to be viewed through the microscope. Such movement will also cause the selected pair of objectives 29 to be moved toward and away from the specimen whereby the microscope can be accurately focused. The device can then be retained in desired adjusted and focused position by means of suitable locking means such as set screw 37.

With the device in properly focused condition, an operator will view images of the specimen in the respective eyepieces 15 and 15a, which images will, due to the use of dual objectives 29 for providing separate optical paths 30 and 31, permit the operator to view the specimen stereoscopically.

Rotatably mounted around the hub 21 within the main housing 12, and consequently also encircling the lower portion of the pivot member 23, is a tubular mirror-supporting member 38 (Fig. 2) which is adapted to be rotated substantially about the axis of the pivot member 23 by means of a lever 39 which is mounted externally of the device on the upper side of the main housing 12. The lever 39 has one end thereof connected to the upper end of the pivot member 23 whereby when the lever 39 is manually moved in a sidewise direction consequent rotary movement of the pivot member 23 will result. The pivot member 23 is provided with a fixed disc 40 thereon, which disc 40 is adapted to be positioned between the adjacent ends of the tubular member 38 and boss 24. A pin 41 is secured to the disc 40 and adapted to extend from the lower side thereof into an opening 41a formed in the upper peripheral edge of the tubular member 38. Thus, when the lever 39 is manually moved as described the movement thereof will be transmitted through the pivot member 23, disc 40 and pin 41 to the tubular member 38 which will consequently be rotated about the hub 21.

Attached in predetermined spaced relation to the tubular member 38 by the arms 42a of a bifurcated bracket 42 are a pair of mirrors 43. The mirrors 43 are mounted in supports 43a and are each adapted to be positioned in aligned relation with a respective axis of the openings 26 in the nosepiece 20 and thereby intersect the respective optical paths 30 and 31. The mirrors 43 are supported in fixed angular positions whereby when they intersect the respective optical paths 30 and 31 the reflecting surfaces thereof will intercept the light rays which enter the main housing 12 through the selected objective 29 and travel along the optical paths 30 and 31 and will deflect them outwardly of the housing 12 toward the camera 11.

A detent 39a is attached to the lever 39 and is adapted to engage a recess 39b provided therefor in the adjacent upper side of the housing 12 when the mirrors 43 are positioned in desired accurately aligned relation with respect to the optical paths 30 and 31. To remove the mirrors 43 from this position, the operator must lift the lever 39 slightly to disengage the detent 39a, and then rotate the lever 39 to move the pivot member 23, the disc 40, and pin 41, and consequently tubular member 38 which will thus swing the mirrors 43 out of the optical paths 30 and 31. A second recess may be provided in the main housing 12 if desired for reception of the detent 39a when the mirrors 43 have been moved out of the optical paths 30 and 31 whereby the operator can be assured that the lever 39 has been moved sufficiently to permit the light rays travelling along the optical paths 30 and 31 to be directed to the eyepieces 15 and 15a rather than to the camera 11.

The camera 11 is formed, as shown in Figs. 2 and 3, as a box-like structure having a wall 44 which is shaped to engage the front wall 12a of the main housing 12, the wall 44 having flanges or brackets 45 thereon whereby the camera can be attached to the wall 12a as by screws, rivets or similar means 46. The wall 44 is provided with a rearwardly extending portion 47 which is adapted to interfit with an opening in the adjacent wall 12a of the housing 12 (Fig. 2) and is further provided with a pair of spaced openings 48 therethrough whereby communication is provided between the interiors of the main housing 12 and camera 11. Thus, when the optical paths 30 and 31 are interrupted by the mirrors 43 when the mirrors overlie the openings 26 in the nosepiece 20, the light rays are then directed from the objective 29 through the openings 48 in the wall 44 to the interior of the camera 11.

In the preferred construction, as shown in Fig. 3, the side walls 49 of the camera are secured at one end to a flange 50 formed around the periphery of the wall 44. The opposed ends of the walls 49 are turned inwardly as at 51 and a cover plate 52 is adapted to be secured thereover and held thereupon by means such as a pair of rotatable locking members 53. The locking members 53 are carried by the cover plate 52 near each end thereof and are provided with lug portions 54 on their inner ends which are adapted to be positioned behind the inwardly turned end portions 51 of the side walls 49 when the members 53 are manually turned. The upper, lower, and side edges of the cover plate 52 are provided with rearwardly extending lips 55 which are adapted to overlie the adjacent edges of the walls 56 and 57 respectively of the camera 11. Thus the unit is completely shielded to prevent entrance of extraneous light.

A leaf spring 58 is attached as by rivets 59 or the like to the inner surface of the cover plate 52 and is pivotally secured at each end to a pressure plate 60 (Fig. 3). The spring 58 is shaped to constantly urge the pressure plate 60 in a direction toward the microscope 10 and toward one end of a dividing plate or web 61 which is provided within the camera 11 and which is adapted to extend longitudinally thereof. The plate or web 61 provides, within the forward end of the camera 11, two relatively large compartments 62 and 63. Partitions 64 and 65 having angularly disposed wall portions 64a—64b and 65a—65b are provided at each respective corner of the camera 11 to form two smaller compartments 66 and 81, the compartment 66 containing a film 67. The wall portions 64b and 65b are joined by an intermediate section 66a having spaced framing openings 66b and 66c separated by the web 61. The film 67 is carried in a conventional manner on a spool 68 having a toothed hub 69 on one end thereof which is shaped to interfit with means such as pin 70 carried on the inner end of a shaft 71 which extends through the upper wall 56 of the camera 11 and having on its outer end a knurled knob 72. The opposed end of the spool 68 is provided with a hub 73 which is adapted to be removably positioned within a container 74 carried by the inner end of a shaft 75 which extends through the lower wall 57 of the camera 11 and having a head portion 76 on the outer end thereof. A coil spring 77 is mounted over the shaft 75 between the container 74 and adjacent inner surface of an embossed portion 78 of the wall 57 whereby the container 74 is continuously urged in a direction toward the spool 68 thereby holding the toothed hub 69 in interlocked relation with the pin 70. Thus to insert a film 67, the operator must grasp the head portion 76 and draw the container 74, against the resiliency of the spring 77, into the cavity formed by the embossed portion 78 whereupon the spool 68 having the film 67 thereon may be inserted in the compartment 66, the operator causing the hub 69 to interfit with the pin means 70 on shaft 71 and subsequently releasing head portion 76 to allow the container 74 to engage the hub 73. Thus the film is retained in desired position within the compartment 66.

The film 67 is subsequently threaded between the pressure plate 60 and the intermediate section 66a, as shown in Fig. 3, and is then wound in a conventional manner on a shaft 79 which has its ends rotatably mounted in the upper and lower walls 56 and 57 of the camera 11 and which has its upper end extending through the wall 56 and carrying thereon a knurled operating knob 80. Thus, an operator can thread the film 67 onto the shaft 79 and by rotating the knob 80 can cause the film 67 to be wound onto the shaft 79.

The compartment 81 contains the shaft 79 and also a cylindrical member 82 which has its end portions 83 rotatably mounted in the upper and lower walls 56 and 57 of the camera and which carries thereon sprocket means 84 which engages the opposed perforated edge portions of the film 67 as it passes from the spool 68 to the shaft 79. The upper end of the cylindrical member 82 is provided with an inclined recess 85 which has one end 86 thereof shaped to provide stop means for engagement with one end of an indexing pin 87 which is longitudinally movable through an opening in the upper wall 56 of the camera 11 in a direction toward and away from the cylindrical member 82. A coil spring 88 is mounted over the indexing pin 87 between a fixed collar 89 carried by the pin 87 and the end of a container 90 carried by the wall 56 whereby the indexing pin 87 is constantly urged toward the cylindrical member 82. Thus, as the film 67 is wound onto the shaft 79 as the operator rotates the knob 80, the cylindrical member 82, due to the engagement of the sprocket means 84 with the perforations, in the film 67, will be simultaneously rotated. The indexing pin 87, which is maintained in engagement with the end of the cylindrical member 82 by the spring 88 as described, will follow the surface of the end of the cylindrical member and will be urged into the recess 85 by the spring 88 as the cylindrical member 82 rotates and will subsequently be engaged by the end 86 of the recess 85. This will prevent further rotation of the knob 80 in this direction by the operator. It is to be understood here that the diameter of the cylindrical member 82 is so controlled that one complete revolution will properly position the film for the sequential exposures. When a sufficient amount of the film has been wound on the shaft 79 to place a portion thereof in proper position for an exposure, the film cannot be moved beyond that point until following the exposure, the indexing pin 87 has been manually lifted out of the recess 85, at which time knob 80 may be manually rotated an amount sufficient to cause the cylindrical member 82 to again make one complete revolution whereupon the indexing pin 87 will again abut the surface 86 of the recess 85 and prevent further movement of the film 67. At this time another exposure can be made.

Any suitable releasable ratchet means may be provided for allowing rotation of the shaft 79 in only one direction, said ratchet means to be released when it is desired to rewind the film on spool 68. Such ratchet means is indicated generally in Fig. 6 of the drawings by numeral 91.

Manually operable shutter means is provided on the rear wall 44 of the camera 11 as shown in Figs. 2, 3 and 5 and embodies a shutter 92 which is adapted to normally cover the openings 48 in the wall 44. The shutter is hinged along its upper edge to the wall 44 by a spring device 93 whereby it is continually urged into closed relation with said openings 48 by the inherent resiliency of the spring device 93. The upper edge of the shutter 92 is provided with a rearwardly extending lip 94 which is adapted to be located and freely movable in a recess 44a formed in the wall 44, the lip 94 being pivotally attached to a headed pin 95 which is mounted for vertical movement longitudinally of a bore 96 provided in the wall 44 between the openings 48. A coil spring 97 is positioned in the bore 96 beneath the end of the pin 95 to continually urge the pin upwardly against an abutment member 98 carried by the lower end of an operating pin 99 which extends through an opening in the upper wall 56 of the camera housing and which carries a button 100 on its outer end. A coiled spring 101 is mounted over the pin 99 between the button 100 and the adjacent surface of the camera wall 56 and is adapted to continually urge the button 100 in a direction away from the wall 56. Thus, to permit light rays to pass from the mirrors 43 through the openings 48 and the framing openings 66b and 66c to the film 67, the operator will press the button 100 which will cause the pin 99 to move downwardly against the tension of the spring 101, which movement will cause a similar downward movement of pin 95 which will consequently cause the shutter 92 to be swung upwardly on the hinge device 93 as shown in dot-dash lines in Fig. 2.

Simultaneously with the upward swinging movement of the shutter 92 a flash bulb or other suitable conventional lighting arrangement (not shown) can be operated to provide sufficient lighting of the specimen for proper exposure of the film. Such mechanism can be operated directly by the shutter 92, such as is shown in Fig. 2, wherein the shutter 92, as it swings upwardly, engages a downwardly extending switch-operating member 102 which in turn will operate the switch mechanism for the electrical circuit, which switch mechanism may be conveniently located such as in the box-like housing 103 on the upper wall 56 of the camera. The release of the manual pressure upon the push button 100 will, of course, allow the shutter 92 to return to its normally closed position over the openings 48 through the action of the coil spring 97. Thus light is again prevented from passing to the film 67.

From the foregoing description it will be seen that an operator of the device in order to examine a specimen microscopically in a conventional manner, must first position the lever 39 in the proper position wherein the mirrors 43 will not intercept the optical axes 30 and 31. Then after selection of the proper objective 29 and adjustment of the objective toward or away from the specimen to obtain proper focussing as previously described, the specimen can be viewed stereoscopically in the eyepieces 15 and 15a. Then if it is desired to photograph the specimen the lever 39 is easily operated to swing the mirrors 43 into the proper position wherein they will intersect the optical paths 30 and 31 as described. This will cause the images of the specimen to be projected from the objective 29 onto the mirrors 43, and then reflected in the direction of the openings 48 after which the film 67 may be exposed thereto by operation of the shutter 92. It will be understood that since the objective comprises a pair of lens systems, one for each eye, the two mirrors 43 will reflect the respective right and left eye images into the compartments 63 and 62 and onto spaced framed portions of the film 67. Thus, after exposure two separate images can be developed on the film 67.

It will be further understood that the two exposures of the right and left eye images are made simultaneously. Thus, it is apparent that moving specimens such, for example, as insects can be photographed stereoscopically, which would be very difficult to accomplish if the right and left eye images were made separately.

From the foregoing description it will be apparent that all of the objects and advantages of the invention have been accomplished. Many changes, however, may be made in the details of construction, arrangement of parts, and method shown and described without departing from the spirit of the invention as expressed in the accompanying claims. Therefore, it is to be understood that all matter set forth or shown in the accompanying drawings is to be interpreted as illustrative and not in a limiting sense.

We claim:

1. A device of the character described comprising a stereoscopic microscope embodying a main housing having a dual objective attached to one side thereof, prism systems located on the opposed side of said main housing, an eyepiece adjacent each of said prism systems for viewing an illuminated specimen microscopically through said dual objective along predetermined adjacent converging optical paths passing through said main housing and prism systems to said eyepieces, a camera housing fixedly attached to said main housing with the interior thereof communicating directly with the interior of said main housing by means of at least one passageway, and a reflecting system carried within said main housing and normally positioned away from said optical paths, said reflecting system being movable transversely relative to said optical paths and into position between said dual objective and prism systems, control means extending exteriorly of said main housing for moving said reflecting system, said reflecting system intersecting said optical paths for reflecting light rays from said objective through said passageway toward a film position in said camera housing for permitting two spaced areas on said film to be simultaneously exposed, said film position being located at a distance from said specimen along said optical paths as reflected by said reflecting system which are optically substantially equal to the distance between said specimen and the image plane of one of said eyepieces when said reflecting system is moved out of intersecting relation with said optical paths, whereby stereoscopic pictures of said specimen can be obtained.

2. A device of the character described comprising a stereoscopic microscope embodying a main housing having a rotatable plate attached to one side thereof, a plurality of dual objects carried by said plate and selectively movable into a predetermined operative position, prism systems located on the opposed side of said main housing and aligned with the dual objective in said operative position, an eyepice adjacent each of said prism systems for viewing an illuminated specimen microscopically through said dual objective aligned therewith along predetermined adjacent converging optical paths passing through said main housing and prism systems to said eyepieces, a camera housing fixedly attached to said main housing with the interior thereof communicating directly with the interior of said main housing by means of at least one passageway, and a reflecting system carried within said main housing and normally positioned away from said optical paths, said reflecting system being movable transversely relative to said optical paths and into position between the dual objective which is in said operative position and prism systems, control means extending exteriorly of said main housing for moving said reflecting system, said reflecting system intersecting said optical paths for reflecting light rays from said objective which is in said operative position through said passageway toward a film position in said camera housing for permitting two spaced areas on said film to be simultaneously exposed, said film position being located at a distance from said specimen along said optical paths as reflected by said reflecting system which are optically substantially equal to the distance between said specimen and the image plane of one of said eyepieces when said reflecting system is moved out of intersecting relation with said optical paths and when any one of the dual objectives is in said operative position, whereby stereoscopic pictures of said specimen can be obtained.

3. A device of the character described comprising a stereoscopic microscope embodying a main housing having a dual objective attached to one side thereof, prism systems located on the opposed side of said main housing, an eyepiece adjacent each of said prism systems for viewing an illuminated specimen microscopically through said dual objective along predetermined adjacent converging optical paths passing through said main housing and prism systems to said eyepieces, a camera housing fixedly attached to said main housing with the interior thereof communicating directly with the interior of said main housing by means of at least one passageway, and a reflecting system carried within said main housing and normally positioned away from said optical paths, said reflecting system being movable transversely relative to said optical paths and into position between said dual objective and prism systems, control means extending exteriorly of said main housing for moving said reflecting system, said reflecting system intersecting said optical paths for reflecting light rays from said objective through said passageway toward a film position in said camera housing for permitting two spaced areas on said film to be simultaneously exposed, said film position being located at a distance from said specimen along said optical paths as reflected by said reflecting system which are optically substantially equal to the distance between said specimen and the image plane of one of said eyepieces when said reflecting system is moved out of intersecting relation with said optical paths, shutter means for closing said passageway, spring means for normally urging said shutter means toward closed position, and control means extending exteriorly of said camera housing for actuating said shutter means to an open position, whereby stereoscopic pictures of said specimen can be obtained.

4. A device of the character described comprising a stereoscopic microscope embodying a main housing having a dual objective attached to one side thereof, prism systems located on the opposed side of said main housing, an eyepiece adjacent each of said prism systems for viewing an illuminated specimen microscopically through said dual objective along predetermined adjacent converging optical paths passing through said main housing and prism systems to said eyepieces, a camera housing fixedly attached to said main housing with the interior thereof communicating directly with the interior of said main housing by means of at least one passageway, and a reflecting system carried within said main housing and normally positioned away from said optical paths, said reflecting system being movable transversely relative to said optical paths and into position between said dual objective and prism systems, control means extending exteriorly of said main housing for moving said reflecting system, said reflecting system intersecting said optical paths for reflecting light rays from said objective through said passageway toward a film position in said camera housing for permitting two spaced areas on said film to be simultaneously exposed, said film position being located at a distance from said specimen along said optical paths as reflected by said reflecting system which are optically substantially equal to the distance between said specimen and the image plane of one of said eyepieces when said reflecting system is moved out of intersecting relation with said optical paths, shutter means for closing said passageway, spring means for normally urging said shutter means toward closed position, and control means extending exteriorly of said camera housing for actuating said shutter means to an open position, and a switch on said camera housing for controlling the energizing of a flash bulb or the like, and said shutter contacting a part operatively associated with said switch for actuating said switch as said shutter reaches its open position, whereby said flash bulb or the like will be energized and the specimen illuminated for providing stereoscopic pictures on film in said camera housing.

5. A device of the character described comprising a microscope embodying a main housing having an objective attached to one side thereof, an eyepiece located on the opposite side of said main housing and in optical alignment with said objective for viewing an illuminated specimen microscopically through said objective along an optical path passing through said main housing to said eyepiece, a camera housing secured to said main housing with the interior thereof communicating directly with the interior of said main housing by means of a passageway, a reflecting system carried within said main housing and movable transversely relative to said optical path into and out of a position between said objective and said eyepiece, control means extending exteriorly of said main housing for moving said reflecting system, said reflecting system when positioned between said objective and said eyepiece intersecting said optical path for reflecting light rays from said objective through said passageway into said camera housing, said camera housing having means therein for supporting a film in a position for receiving said reflected light rays, said film position being located at a distance from said specimen along said optical path as reflected by said reflecting system which is optically substantially equal to the distance between said specimen and the image plane in said eyepiece when said reflecting system is moved out of intersecting relation with said optical path, shutter means for closing said passageway, spring means for normally urging said shutter means towards closed position, control means extending exteriorly of said camera housing for actuating said shutter means to an open position to permit said light rays reflected by said reflecting system to enter said camera housing for exposure of a film therein, and a switch on said camera housing for controlling the energizing of a flash bulb or the like, said shutter means contacting a part operatively associated with said switch for actuating said switch as said shutter means reaches its open position, whereby said flash bulb or the like will be energized and the specimen illuminated for providing a picture on film in said camera housing.

References Cited in the file of this patent

UNITED STATES PATENTS

| | | |
|---|---|---|
| 1,505,268 | Larson | Aug. 19, 1924 |
| 1,548,675 | Gayhart | Aug. 4, 1925 |
| 2,006,914 | Fayolle | July 2, 1935 |
| 2,351,753 | Flint | June 20, 1944 |